March 5, 1929. R. L. MAYHUGH 1,704,096
FLOWER HOLDER
Filed Sept. 22, 1927 2 Sheets-Sheet 1
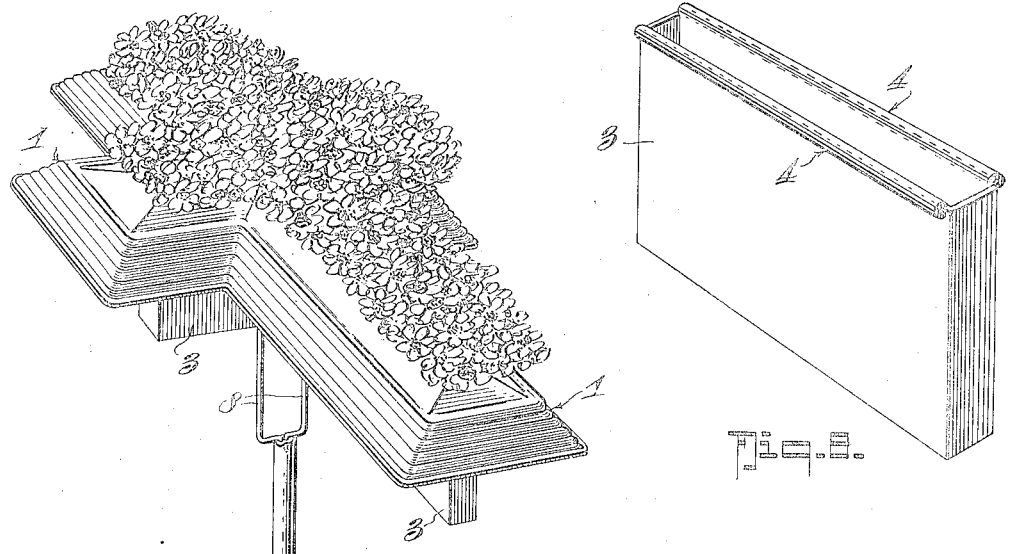
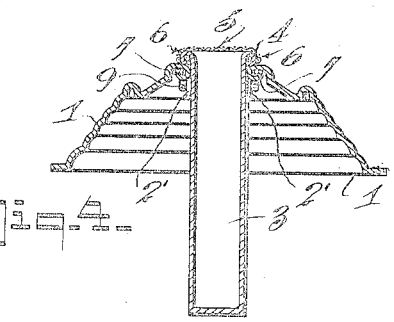
INVENTOR
R. L. Mayhugh.
BY
ATTORNEY

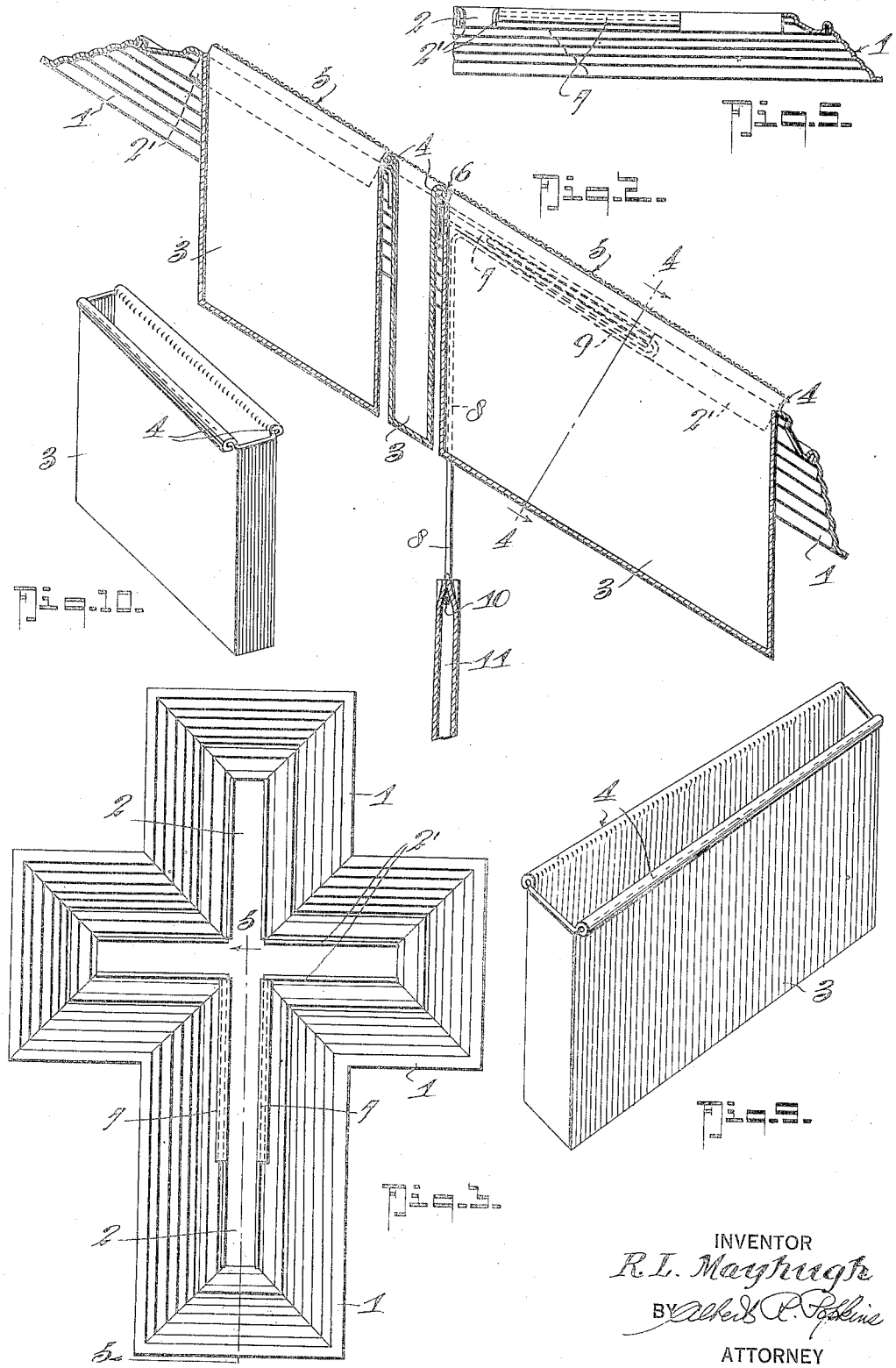

Patented Mar. 5, 1929.

1,704,096

UNITED STATES PATENT OFFICE.

ROBERT L. MAYHUGH, OF WASHINGTON, DISTRICT OF COLUMBIA.

FLOWER HOLDER.

Application filed September 22, 1927. Serial No. 221,362.

This invention relates to a device for holding flowers and the like, the general object of the invention being to provide a body provided with water holding receptacles into which the stems of the flowers project so that the flowers will be kept fresh for a long time, the body being of any desired shape such as a cross, crescent, harp, star, heart, wreath, anchor, etc., with the flower holding means so formed that the flowers placed therein will form the same design as that of the body so that an unskilled person can form the design by simply placing the flowers in the flower receiving space of the device.
Another object of the invention is to provide suitable supporting means for the device, such means holding the device in elevated position when desired, and when the device is used on a grave, the supporting means would be made in the form of a post adapted to be driven into the ground.

Another object of the invention is to make the water receptacles removable so that they can be easily filled with water and emptied and also to provide a screen or the like for covering the top of each receptacle, through the interstices of which the flowers are passed, to support the flowers in position.

A still further object of the invention is to make the device detachable from the supporting means.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a perspective view showing the device placed on a grave.
Figure 2 is a longitudinal sectional view through the device.

Figure 3 is a plan view.

Figure 4 is a section on line 4—4 of Figure 2.
Figure 5 is a section on line 5—5 of Figure 3.

Figure 6 is a perspective view of the lower part of the post and anchor.

Figure 7 is a perspective view of the means for detachably connecting the device with the post.

Figures 8, 9 and 10 are views of the three receptacles used with the device.

In these views, 1 indicates the body of the device which may be made in the form of any suitable design, the drawings showing the body made in the form of a cross. This body is preferably formed of pressed metal, with diverging sides and ends which are corrugated to add to the attractive appearance of the device. Longitudinal and transverse openings 2 are formed in the upper face of the body, the transverse opening being located in the arms of the cross and intersecting the longitudinal opening. Tanks or water receptacles 3 are placed in these openings, the upper edges of the receptacles being rolled, as shown at 4, so that they will rest upon those portions of the body adjacent the openings, as clearly shown in Figure 4, and thus the receptacles will be supported in dependent position in the body. The metal cut to form the openings 2 is bent downwardly to provide the flanges 2' which engage the upper portions of the receptacles and thus firmly hold the receptacles in place and prevent any movement of the receptacles in the openings. As the body is intended to be supported in a position inclined to the horizontal, as shown in Figures 1 and 2, the water receptacles are formed with inclined tops and bottoms, as shown in Figure 2, so that they will be supported in vertical position when placed in the body.

As shown in Figure 2, two of the receptacles are placed in the longitudinal opening and a single transversely arranged receptacle is placed in the transverse opening, with the central portion between the other two receptacles. A cover 5, formed of wire mesh or the like, is placed over the upper end of each receptacle, this cover having rounded side edges 6, these edges slidingly engaging the rolled edges 4 so that the cover can be easily placed over the receptacle or removed therefrom by a sliding movement of the cover. The stems of the flowers are passed through the interstices of the covers so that they will enter the water in the receptacles, as will be understood. As shown in the drawings, the portions of the body adjacent the openings are slightly raised above the rest of the body.

The metal forming the side walls of the lower part of the longitudinal opening 2 is rolled to form guideways 7 for parts of a holder 8, this holder being formed of wire or the like looped upon itself to form a U-shaped member, with the extremities of the limbs bent at an angle, these extremities being of U-shape, as shown at 9, with the free limbs of the U engaging the guideways 7 to detachably connect the body with the holder. A tongue 10 is formed on the lower end of the holder and is adapted to enter the upper end of a tubular post 11 after which the said upper end is bent inwardly to firmly connect the holder with the post. An anchor 12 is secured to the post adjacent the lower end thereof so that when the post is driven into the ground, it will be supported firmly in position.

From the foregoing it will be seen that I have provided a flower supporting device in which the flowers will be kept fresh for a long time and one in which the flowers can be placed to take the form of the design of the body of the device by simply placing the stems of the flowers through the interstices of the covers so that an unskilled person can place the flowers to form the design. The post will support the device in elevated position over a grave and the tanks or receptacles can be easily filled and emptied by removing them from the body. The body can be removed from the supporting means whenever desired by giving it a sliding movement upwardly so as to release it from the limbs of the holder 8.

As before stated, the body may be made of any desired design and the flowers, when placed in the receptacles, will form the same design. The body is so formed as to add to the decorative effect of the device when filled with flowers.

It is thought from the foregoing description that the advantages and novel features of my invention will be readily apparent.

It is to be understood that changes may be made in the construction and in the combination and arrangement of the several parts, provided that such changes fall within the scope of the appended claims.

What I claim is:

1. A flower holder comprising a body shaped to form an ornamental design, said body having an opening in its upper face of the same shape as the design formed by the body, a removable water receptacle placed in the opening and filling the same, and having its upper edges supported from the walls of the opening, a perforated cover for the receptacle, through the perforations of which the stems of the flowers are adapted to be passed into the receptacle, supporting means, and means for detachably connecting the body with said supporting means.

2. A flower holder comprising a body shaped to form a design, and having an opening therein of the same shape as the design formed by the body, said body being formed with diverging side and end walls, a removable water receptacle placed in the opening and filling the same and depending from the body and having its upper end open, flower holding means covering the open end of the receptacle and supporting means detachably connected with the body.

3. A device of the class described comprising a body shaped to form an ornamental design, said body having an opening in the upper face thereof of the same contour as the design formed by the body, a water receptacle removably arranged in the opening with its upper edges flanged to engage the walls of the opening, a holder having arms thereon, guideways formed on the body for receiving the arms, said parts being formed to hold the body in a position inclined to the horizontal, and a post having its upper end attached to the lower end of the holder.

4. A device of the character described comprising a body shaped to form a design and having diverging side and end walls with an opening in the upper face of the body of the same shape as the design formed by the body, a water receptacle removably arranged in the opening with its upper edge flanged to engage the walls of the opening, a removable perforated cover for such receptacle, a holder having arms thereon, guideways formed on the body for receiving the arms, said parts being formed to hold the body in a position inclined to the horizontal, a post having its upper end attached to the lower end of the holder, the receptacle being formed with an inclined top and bottom whereby it will be supported in a vertical position from the body when the body is in an inclined position.

5. A flower holder comprising a body shaped to form a design and having intersecting openings therein forming a design similar to the design formed by the body and a removable water receptacle fitting into each opening and adapted to receive the stems of the flowers.

In testimony whereof I affix my signature.

ROBERT L. MAYHUGH.